(12) United States Patent
Jain

(10) Patent No.: US 10,908,598 B1
(45) Date of Patent: Feb. 2, 2021

(54) INTEGRATED CIRCUITS DESIGNED FOR MULTIPLE SETS OF CRITERIA

(71) Applicant: XILINX, INC., San Jose, CA (US)

(72) Inventor: Praful Jain, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/426,945

(22) Filed: May 30, 2019

(51) Int. Cl.
*G05B 19/418* (2006.01)
*G06F 30/30* (2020.01)

(52) U.S. Cl.
CPC ....... *G05B 19/41875* (2013.01); *G06F 30/30* (2020.01); *G05B 2219/40361* (2013.01); *G05B 2219/45031* (2013.01)

(58) Field of Classification Search
CPC .... G05B 19/41875; G05B 2219/45031; G05B 2219/40361; G06F 30/30
See application file for complete search history.

(56) References Cited

U.S. PATENT DOCUMENTS

| 5,663,891 | A | 9/1997 | Bamji et al. |
| 7,020,860 | B1* | 3/2006 | Zhao ................ G01R 31/31832 716/54 |
| 7,475,366 | B2 | 1/2009 | Kuemerle et al. |
| 7,541,613 | B2* | 6/2009 | Anderson ............... H01L 22/20 257/48 |
| 8,086,988 | B2* | 12/2011 | Buck ...................... G06F 30/30 716/132 |
| 8,849,438 | B2* | 9/2014 | Parikh .............. G05B 19/41875 700/96 |
| 9,165,931 | B1* | 10/2015 | Schmit ................ G06F 15/7867 |
| 9,361,424 | B2 | 6/2016 | Robles |
| 9,881,120 | B1* | 1/2018 | Ginetti .................. G06F 30/367 |
| 9,977,856 | B2* | 5/2018 | Robles .................. G06F 30/367 |
| 10,621,295 | B2* | 4/2020 | Liu ............................ G06F 7/58 |
| 10,705,515 | B2* | 7/2020 | Dunlop ............ G05B 19/41875 |
| 2008/0034337 | A1* | 2/2008 | Kuemerle ............... G06F 30/30 716/134 |
| 2008/0078994 | A1* | 4/2008 | Seshan ................ H01L 25/0657 257/48 |
| 2008/0079460 | A1* | 4/2008 | Veredas-Ramirez ....................... H03K 19/17748 326/41 |
| 2010/0293512 | A1* | 11/2010 | Buck .................... G06F 30/3312 716/113 |
| 2013/0214432 | A1* | 8/2013 | Wu ........................ H01L 23/147 257/782 |
| 2014/0040850 | A1* | 2/2014 | Sawicki ................ G06F 30/398 716/132 |
| 2015/0067618 | A1* | 3/2015 | Robles .................. G06F 30/367 716/52 |
| 2018/0083635 | A1* | 3/2018 | Wu ..................... H03K 19/0175 |
| 2019/0042936 | A1* | 2/2019 | Guim Bernat ........... G06N 3/08 |
| 2019/0236370 | A1* | 8/2019 | Man .................... G06Q 10/0633 |

(Continued)

*Primary Examiner* — Stacy Whitmore
(74) *Attorney, Agent, or Firm* — Patterson + Sheridan, LLP

(57) ABSTRACT

Examples described herein provide a method for designing an integrated circuit (IC) for meeting different sets of criteria. In an example, different sets of criteria are identified for an IC design. The IC design is designed to meet the different sets of criteria based on expected manufacturing variation. The IC design is caused to be manufactured as IC products. At least some of the IC products are caused to be tested. The IC products are characterized as meeting respective ones of the different sets of criteria based on testing the at least some of the IC products.

17 Claims, 3 Drawing Sheets

(56) References Cited

U.S. PATENT DOCUMENTS

| | | | |
|---|---|---|---|
| 2019/0271971 A1* | 9/2019 | Dunlop | G05B 19/41875 |
| 2020/0056578 A1* | 2/2020 | Sheldon-Coulson | B63B 35/44 |
| 2020/0117181 A1* | 4/2020 | Cella | G06N 3/02 |
| 2020/0150643 A1* | 5/2020 | Cella | G05B 23/0297 |
| 2020/0159206 A1* | 5/2020 | Cella | G06N 3/088 |
| 2020/0174464 A1* | 6/2020 | Cella | G05B 19/41865 |

* cited by examiner

US 10,908,598 B1

INTEGRATED CIRCUITS DESIGNED FOR MULTIPLE SETS OF CRITERIA

TECHNICAL FIELD

Examples of the present disclosure generally relate to integrated circuits and, in particular, to integrated circuits designed for multiple sets of criteria.

BACKGROUND

Programmable integrated circuits (ICs), such as field programmable gate array (FPGA), permit flexibility in their use. For example, user designs can be deployed in an FPGA in a number of different applications. The ability for a user to create a user design can permit the FPGA to be configured specifically to the user's application. Theoretically, a single programmable IC can be deployed with an appropriate user design in any number of applications. Practically, environmental factors and/or operating conditions may preclude one programmable IC from being able to be deployed in the different applications.

SUMMARY

Examples described herein provide a method for designing an integrated circuit (IC) for meeting different sets of criteria. By creating an IC design to accommodate multiple sets of criteria, different IC products manufactured according to the IC design can perform and satisfy requirements for different use applications.

An example is a method. Different sets of criteria are identified for an IC design. The IC design is designed to meet the different sets of criteria based on expected manufacturing variation. The IC design is caused to be manufactured as IC products. At least some of the IC products are caused to be tested. The IC products are characterized as meeting respective ones of the different sets of criteria based on testing the at least some of the IC products.

Another example is a method. Historical data related to one or more manufacturing processes is provided. IC products are manufactured based on an IC design using the one or more manufacturing processes. The IC design is designed based on an expected manufacturing variation to meet different sets of criteria. The expected manufacturing variation is derived from a statistical analysis of the historical data. At least some of the IC products are tested to obtain test results. The IC products are capable of being characterized for respective ones of the different sets of criteria based on the test results.

A further example is a method. A statistical analysis of data obtained for one or more manufacturing processes is performed to generate expected manufacturing variation. An IC design is created to meet different sets of criteria based on the expected manufacturing variation. Creating the IC design includes determining whether the IC design is expected to meet the different sets of criteria including simulating the IC design using the expected manufacturing variation. IC products are manufactured based on the IC design and using the one or more manufacturing processes. Testing is performed to determine characteristics of the IC products. The IC products are characterized to meet respective ones of the different sets of criteria based on the characteristics.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
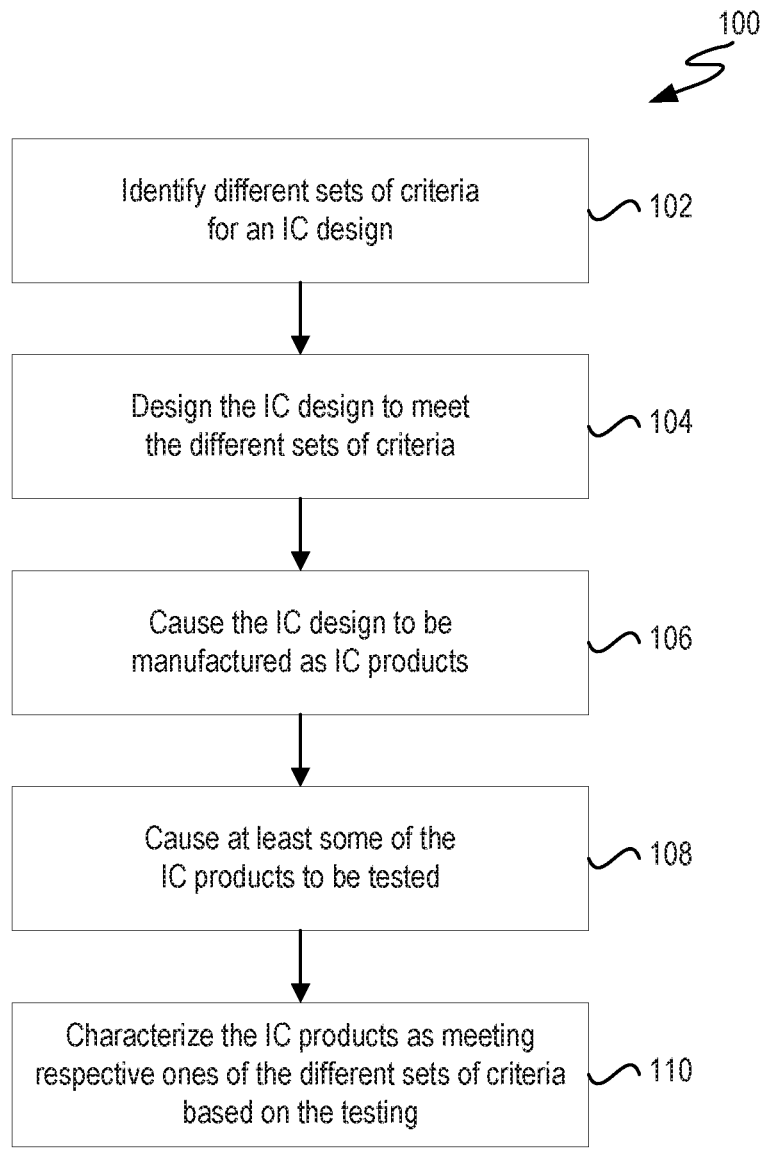
FIG. 1 is a flowchart of example operations to design and manufacture IC products according to some examples.

Examples described herein provide a method for designing an integrated circuit (IC) for meeting different sets of criteria. The methodology disclosed herein contemplates creation of an IC design that can satisfy different specifications that can permit different IC products manufactured according to the IC design to be deployed in multiple different use applications, such as data centers, automotive, machine learning, etc. By creating an IC design to accommodate multiple sets of criteria, different IC products manufactured according to the IC design can perform and satisfy requirements for different use applications.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams or figures to refer to the same items; however, in other examples the items may be different.

Traditionally, specifications have been defined by various factors or criteria, such as process corner, junction temperature during operation, and lifetime requirements, that permit the manufactured IC products to operate in corresponding use applications. Generally, an IC design is designed such that the IC product is able to meet the most stringent specification. For example, a specification can involve an IC product operating in an environment of 100 degrees Celsius for a minimum of a ten year lifetime. Such a specification can restrict the amount of current supplied to the IC product through package balls because of reliability and electromigration rules. Such a specification is also defined at the worst process corner for both leakage and interconnect performance when the IC product is in an environment of 100 degrees Celsius.

When the IC products are manufactured according to the IC design, manufacturing variation may result in some of the IC products not being able to meet the most stringent specification, but the IC products may be able to meet less stringent specifications. Hence, such IC products could be used in use applications that have less stringent specifications. A significant problem with this approach is that the IC design is not optimized for specifications and/or use applications other than the most stringent specification. Accordingly, the IC products that are implemented in use applications other than the use application having the most stringent specification can have significant unnecessary overhead and/or features due to the IC design being based on the most stringent specification.

For example, suppose a most stringent specification is for an automotive application where an IC product is operated in an environment of 100 degrees Celsius with a lifetime of 10 years. Further, the same IC product could be operated in a data center application where the ambient environment does not exceed 25 degrees Celsius, where sophisticated cooling technology is implemented, and where the lifetime of the IC product can be 5 years. The IC design would be designed directed to the specification of the automotive application, and if an IC product that is manufactured according to the IC design does not meet the specification for the automotive application (e.g., because the IC product would have too high of a current at 100 degrees Celsius), the IC product may nevertheless still be used in the data center application. However, the IC product, when implemented in the data center application, can have features (e.g., a 10 year lifetime) that far exceed what is needed by the data center application, and hence, those features are useless, unnecessarily restrict operation of the IC product (e.g., by limiting current and/or power consumption), and/or unnecessarily increase a cost to manufacture the IC product for the data center application.

Examples disclosed herein describe a methodology of designing an IC design such that IC products manufactured according to the IC design can fulfill a variety of sets of criteria. A single IC design can cater to many use applications. The methodology can use manufacturing variation to design the IC design such that resulting IC products are directed to many specifications, which may correspond to different use applications. Such a methodology can reduce unnecessary features of an IC product for a given use application while also reducing manufacturing costs.

FIG. 1 is a flowchart of example operations to design and manufacture IC products according to some examples. Operations 100 begin at block 102 that includes identifying different sets of criteria for an IC design. Each set of criteria may correspond to a use application for the IC design. For example, one use application prescribes a set of criteria for the IC design so that IC products manufactured from the IC design can operate for 10 years at 100 degrees Celsius, and another use application prescribes a set of criteria for the IC design so that IC products manufactured from the IC design can operate for 5 years at 80 degrees Celsius. Accordingly, block 102 comprises identifying more than one set of criteria for the IC design. A set of criteria can include criteria that correspond to lifetime of the IC product, ambient environment temperature in which the IC product is to operate, operating junction temperature of the IC product, leakage current limit, power consumption limit and/or threshold, operating speed, etc.

At block 104, operations 100 continue with designing the IC design to meet the different sets of criteria. The IC design is designed such that respective ones of the IC products manufactured from the IC design can operate based on each set of criteria. For example, some IC products manufactured from the IC design can operate at 100 degrees Celsius for 10 years, and other IC products manufactured from the IC design can operate at 80 degrees Celsius for 5 years.

Block 104 of designing the IC design can be based on expected manufacturing variation when manufacturing IC products based on the IC design. Manufacturing variation can cause IC products manufactured using the same processes to have device-to-device variation (e.g., some IC products can be operated differently than others). Processing that can result in manufacturing variation can include implanting dopants (e.g., by non-uniformity across a wafer and/or consistency lot-to-lot), film deposition uniformity (e.g., material composition non-uniformity and/or step coverage across a wafer), and film deposition consistency (e.g., repeatability lot-to-lot), lithography alignment (e.g., for etching that results in possible relative placement variation for metal lines, contacts, plugs). etc.

The expected manufacturing variation can be determined by an analysis of previous processing that is to be used to manufacture IC products based on the IC design. Various tools and chambers used in semiconductor processing can have historical data that can be analyzed by a statistical analysis to determine effects of the tool or chamber on a manufactured IC product. For example, a chamber in which a dopant implantation is performed can have historical data relating to, for a number of wafers and/or lots, a difference between a target concentration of dopants implanted in a wafer using the chamber (e.g., as indicated by a recipe) and a measured concentration of dopants implanted in the wafer using the chamber, and a measured effect, such as leakage current, correlated to the difference.

Using this historical data, a statistical model can be created to simulate expected results of manufacturing according to the IC design. Simulating the manufacturing can determine an expected distribution of IC products that can meet the different sets of criteria. If the simulation results in the expected distribution of IC products not meeting one or more of the sets of criteria (e.g., does not meet the specification for a use application) and/or an insufficient number or percentage of IC products in the expected distribution would be manufactured meeting a given set of criteria, a re-design process may be performed. Accordingly, the designing of block 104 can be an iterative process.

At block 106, operations 100 continue with causing the IC design to be manufactured as IC products. The IC design can be reduced to recipes and masks that can be a basis for semiconductor processing by a fabrication facility (e.g., a "fab") to manufacture the IC products. Generally, the manufacturing can introduce manufacturing variation across the IC products. The manufacturing of the IC products can be performed by an independent, third party or by the entity designing the IC design at block 104.

At block 108, operations 100 continue with causing at least some of the IC products to be tested. Testing at least some of the IC products can involve testing the operation of an IC product to determine if the IC product is generating the proper output signals based on input signals. Testing can also involve measuring electrical characteristics (e.g., which may use test structures in scribe lines) of the wafer in which the IC product is formed and/or the IC product. Each IC product can be tested individually, and/or testing at, e.g., a wafer-level can be performed where characteristics of the IC products manufactured on the wafer can be extrapolated from the testing. The testing may be performed by the party that manufactured the IC products in block 106 (e.g., by an independent, third party) and/or by the entity designing the IC design at block 104.

At block 110, operations 100 continue with characterizing the IC products as meeting respective ones of the different sets of criteria based on the testing of block 108. In some examples, the characterization is based on the test results of the at least some of the IC products. The characterization of each of the IC products can involve determining which of the set of criteria the IC product can meet based on the characteristics of the IC product determined from the testing of block 108. An IC product is characterized such that the characterization may determine in which use application the IC product can be deployed.

The operations 100 may also include operating any of the IC products in a use application, where the deployment of a respective IC product for the use application is based on the set of criteria for which the respective IC product was characterized.

According to some examples, an IC design can be designed to be more tailored to each of the various use applications by beneficially considering expected manufacturing variation in the design process. This can permit IC products to be manufactured using more relaxed processing, which can lead to more cost efficiencies during manufacturing. Further, the IC products can omit more unnecessary features and/or overhead because the IC design was designed in a way that the distribution of variation between IC products as considered during design resulted in such features and/or overhead being omitted.

In certain examples, the IC design is a design for a programmable IC product, such as a field programmable gate array (FPGA) product. A programmable IC product can be deployed in a number of use applications because of its flexibility to be programmed or configured to implement a number of different user designs. In some examples, a programmable IC product can be deployed in use applications such as data centers, automotive, machine learning, cryptocurrency mining, etc. Each use application can have drastically different specifications. By considering how manufacturing variation can affect IC products' ability to meet these different specifications during a design process, the IC products can be manufactured less expensively and more tailored to the specific use application.

In some examples, a design of an FPGA product can contemplate use applications, where a first set of criteria is for operation at 80 degrees Celsius for a lifetime of less than 5 years, and a second set of criteria is for operation at 100 degrees Celsius for a lifetime of 10 years. As an example, the first set can be for a data center application where rapidly evolving technology can cause a data center operator to replace components within three years and where sophisticated cooling systems and/or cool ambient environments (e.g., 25 to 35 degrees Celsius) are implemented. The second set can be for an automotive application where a component is desired to be operable for a long duration and at high temperatures.

Relative to an FPGA product that meets the second set, an FPGA product meeting the first set of criteria can be operated with increased voltage overdrive of circuits, can have reduced leakage (e.g., about a 40% to 50% reduction), can have increased performance per Watt of power consumption (e.g., about 30% to 40%), and can have reduced parasitic resistance-capacitance (RC). Under the first set of criteria, electromigration rules can be relaxed, which can permit higher current flow in the FPGA product. By considering these sets of criteria during design, the IC design is simulated such that an expected distribution of manufactured FPGA products can produce sufficient FPGA products that can meet these different sets of criteria. The IC design can have relaxed rules and/or processing where, for example, some top percentage of a distribution can meet the second set of criteria and some bottom percentage of a distribution can meet the first set of criteria.

Additionally, when the IC design is for a programmable IC, such as an FPGA (as detailed below), the designing of block 104 can further include creating respective speed files for IC products that meet the different sets of criteria. The IC products can have different power consumption, operating voltage, frequency, etc. as manufactured. A user can create a user design on a processor-based system (e.g., an design tool implemented on a computer), and the user design can be compiled into, e.g., a bitstream and/or another file (e.g., a boot image file) to be loaded onto the IC product to program or configure the IC product according to the user design. The creation of the user design can be based on a corresponding speed file. The speed file informs, e.g., the design tool of operating parameters of the IC product on which the user design will be implemented. For example, simulation of the user design in the design tool is based on the parameters provided by the speed file. The design tool can maintain a library of various speed files, and a user can select, e.g., via a graphical user interface (e.g., on a display device) and input/output device (e.g., a mouse), a speed file corresponding to a given IC product when creating the user design.

Figure 2:
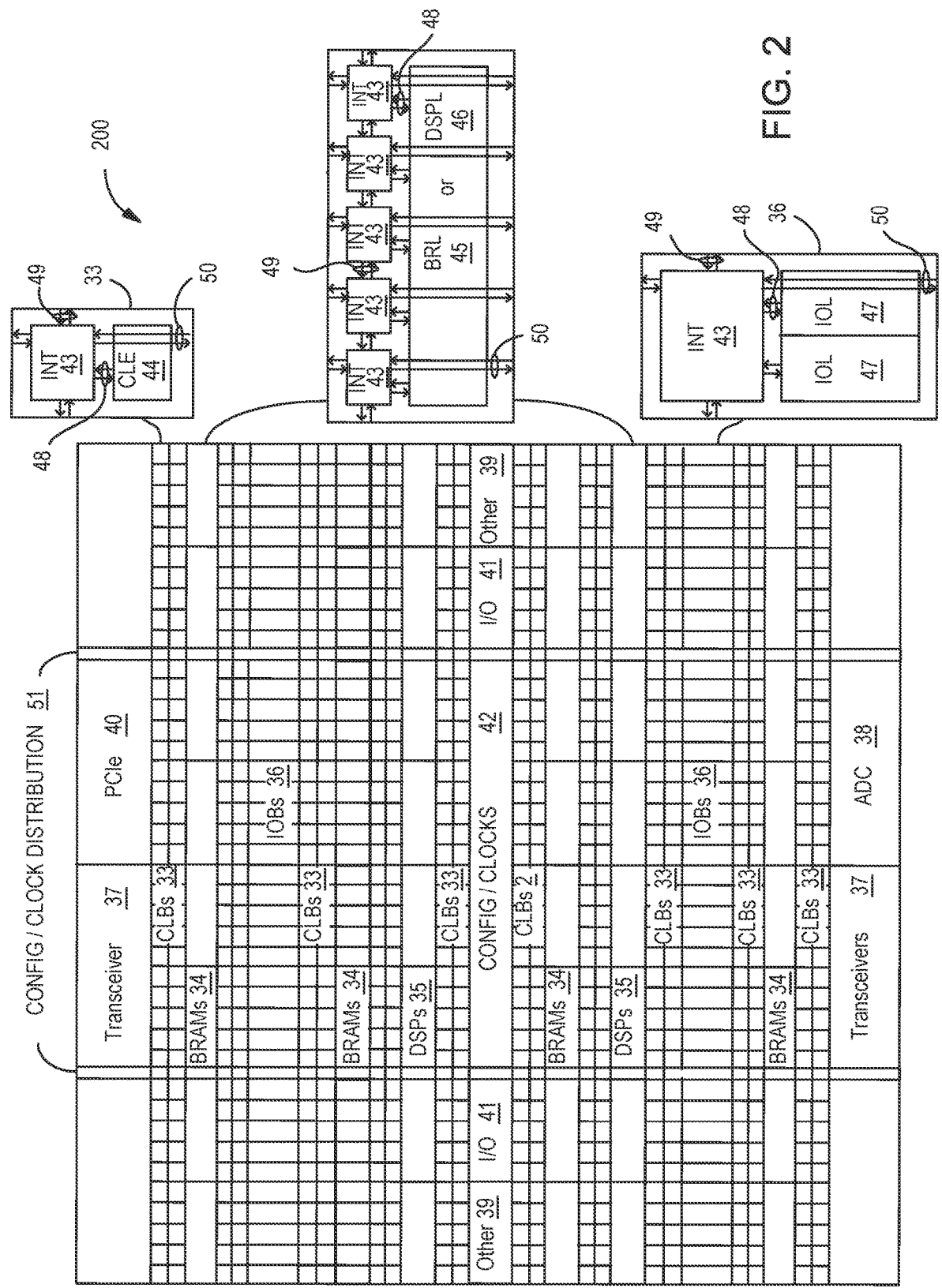
FIG. 2 is a field programmable gate array (FPGA) for an FPGA product that may be designed and manufactured according to some examples.

FIG. 2 illustrates an FPGA 200 for an FPGA product that may be designed and manufactured according to some examples. The FPGA 200 includes a large number of different programmable tiles including transceivers 37, configurable logic blocks (CLBs) 33, random access memory blocks (BRAM) 34, input/output blocks ("IOBs") 36, configuration and clocking logic ("CONFIG/CLOCKS") 42, digital signal processing blocks (DSPs) 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 2. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. In an example, the BRAM 34 is one of the memory blocks which can retain stored data during reconfigurations. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 2) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 2 include additional logic blocks that disrupt the regular columnar structure making up a large part of the FPGA. The additional logic blocks can be programmable blocks and/or dedicated logic.

Note that FIG. 2 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 2 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Some examples can be applied to IC designs for IC products that include stacked dies, such as an Active die-on-Active die (AoA) product. The nature of stacked dies can amplify differences between sets of criteria, which can render an IC design for IC products that include stacked dies more amenable to the design and manufacturing as described herein.

In stacked dies, power and signals can be routed through lower dies to higher dies. This can increase parasitic power consumption in lower dies and can increase junction temperatures at lower dies. Additionally, heat dissipation of thermal energy generated by lower dies can be more difficult because of a physical distance of the lower dies from, e.g., a heat sink. Even further, thermal energy and increased temperatures in dies can cause increased power consumption in those dies, which can, in turn, increase thermal energy and temperature.

Similarly, package substrates for IC products can have criteria that can vary based on use applications. For example, lifetime and temperature criteria can affect an amount of power that can be provided to a die(s) through the package substrate. Electromigration of metal from metal lines and/or solder balls generally increases with increasing current and temperature. Accordingly, generally, more power supplied through the package substrate at higher temperatures can result in a much lower lifetime of the package substrate.

Accordingly, an IC design for sets of criteria that have different operating temperatures can permit significant differences in IC products for different use applications. If, for example, a first set of criteria is for the IC products having the stacked dies to have a lifetime of 10 years at 100 degrees Celsius, the package substrate could supply approximately 1.333 W/mm$^2$ of power. If, in that example, a first one of the stacked dies requires approximately 0.3 W/mm$^2$ of power, approximately 1.033 W/mm$^2$ of power would be available to the other dies. If, however, a second set of criteria is for the IC products having the stacked dies to have a lifetime of 3 years at 80 degrees Celsius, power of the first one of the stacked dies can require approximately 0.183 W/mm$^2$; a difference of approximately 0.117 W/mm$^2$, which can permit frequency of the die to be increased. Further, by reducing the lifetime, the package substrate could supply approximately 1.667 W/mm$^2$ of power, which permits more power to the dies, which can permit increased performance. Different use applications can have different criteria because, as an example, sophisticated cooling mechanisms can be implemented, which can reduce the operating temperature of IC products in those use applications.

Figure 3:
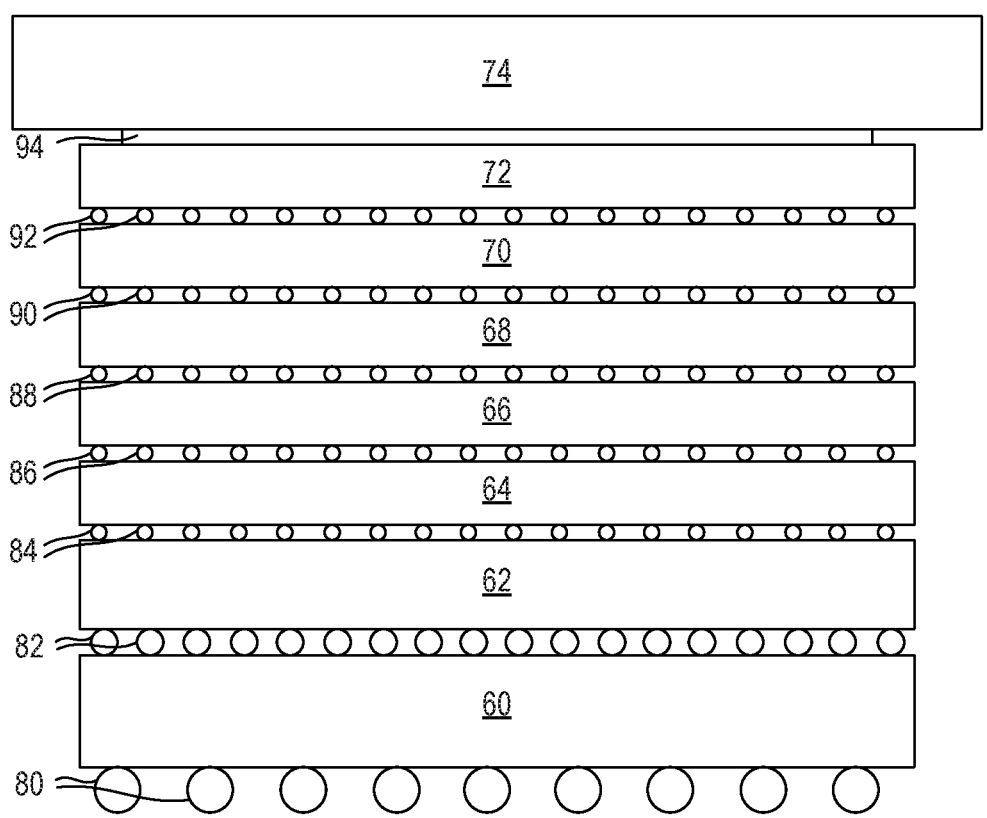
FIG. 3 is a structure of an IC product that includes stacked dies according to some examples.

FIG. 3 is a structure of an IC product that includes stacked dies (e.g., AoA) according to some examples. FIG. 3 is provided for context of the preceding discussion of stacked dies and package substrates. Various other IC products can have different structures, different number of dies, additional components, etc.

The IC product includes a package substrate 60, a first die 62, a second die 64, a third die 66, a fourth die 68, a fifth die 70, a sixth die 72, and a heat sink 74. Generally, the dies 62-72 are stacked and form a die stack in the IC product.

External connectors 80 are attached to the package substrate 60 and may further be attached to, e.g., a printed circuit board (PCB) to attach the package substrate 60 (and hence, the IC product) to the PCB. The external connectors 80 may be, for example, ball grid array (BGA) balls or other connectors. External connectors 82 are attached to the first die 62 (e.g., on a front side) and to the package substrate 60 on a side opposite from the external connectors 80. The external connectors 82 can be, for example, controlled collapse chip connections (C4) bumps or other connectors. External connectors 84 are attached to the second die 64 (e.g., on a front side) and to the first die 62 (e.g., on a backside). External connectors 86 are attached to the third die 66 (e.g., on a front side) and to the second die 64 (e.g., on a backside). External connectors 88 are attached to the fourth die 68 (e.g., on a front side) and to the third die 66 (e.g., on a backside). External connectors 90 are attached to the fifth die 70 (e.g., on a front side) and to the fourth die 68 (e.g., on a backside). External connectors 92 are attached to the sixth die 72 (e.g., on a front side) and to the fifth die 70 (e.g., on a backside). The external connectors 84, 86, 88, 90, 92 can be, for example, microbumps, minibumps, or other connectors. An adhesive 94 is adhered to the heat sink 74 and the sixth die 72 (e.g., on a backside). The adhesive 94 can be any thermally conductive adhesive.

In other examples, the dies 62-72 can be bonded together without the use of external connectors (such as by wafer-to-wafer bonding or die-to wafer bonding). In some examples, some of the dies 62-72 can be attached together by external connectors while others of the dies can be bonded together without use of external connectors. Any permutation of bonding and use of external connectors can be implemented.

One die stack including the dies 62-72 is illustrated in FIG. 3. In other examples, multiple die stacks can be implemented in an IC product. For example, an interposer can be implemented between the package substrate 60 and the first die 62, such that the die stack of dies 62-72 are attached to the interposer, and another die stack can be attached to the interposer. In some examples, another die stack can be attached to the package substrate 60.

Any heat sink 74 can be implemented. The heat sink 74 can also take the form of a lid. The heat sink 74 can have any physical configuration. In the illustrated example, the adhesive 94 attaches the heat sink 74 to the die stack of dies 62-72. In other forms, the heat sink 74 can be mechanically attached to other structures, such as a PCB, the package substrate 60, and/or an encapsulant (such as a molding compound, molding underfill (MUF), or the like). In such instances, a thermal grease can be implemented in the place of the adhesive 94, for example.

As indicated, various other components can be included in an IC product. For example, an interposer, an encapsulant (such as a molding compound, MUF, or the like), etc. can be included in the IC product. A person having ordinary skill in the art will readily envision various modifications that can be made to the IC product.

As an example, the first die 62 can have an interconnect IC; each of the dies 64-70 can have a same programmable IC; and the sixth die 72 can have an accelerator IC. Each of the dies 62-70 include through-substrate vias (TSVs) through the respective semiconductor substrates of the dies 62-70 to accommodate directing signals and power vertically in the die stack. The interconnect IC on the first die 62 can route and direct signals and power horizontally and then vertically in the die stack. The interconnect IC can further include various subsystems and may be a System-on-Chip (SoC). For example, the interconnect IC can include a processing system that, among other things, can control configurations or programming of the programmable ICs of the dies 64-70. Additionally, the interconnect IC can have a Network-on-Chip (NoC), input/output blocks (such as eXtreme Performance Input/Output (XPIO), multi-gigabit transceivers (MGTs), high bandwidth memory (HBM) interfaces, peripheral component interconnect express (PCIe) interfaces, cache coherent interconnect for accelerators (CCIX) interfaces, Analog-to-Digital Converters (ADC), Digital-to-Analog Converters (DAC), etc.), and/or any intellectual property (IP) hard blocks (such as memory controllers (like double data rate (DDR) memory controllers, high bandwidth memory (HBM) memory controllers, or the like), PCIe blocks, CCIX blocks, Ethernet cores, forward error correction (FEC) blocks, etc.).

The programmable ICs of the dies 64-70 can include programmable logic regions. The programmable logic regions can include programmable logic elements including CLBs, BRAM, IOBs, DSPs, clock managers, and/or delay lock loops (DLLs), such as described above. The programmable logic regions can further include programmable interconnect elements associated with programmable logic elements, such as described above. In some examples, the programmable ICs can include a controller (with boot read-only memory (ROM)) and a NoC. The controller can read the ROM to configure the respective programmable IC to a base configuration that permits the programmable IC to receive configuration data, e.g., from the interconnect IC of the first die 62 for a system-level configuration.

The accelerator IC of the sixth die 72 can include any accelerator. The accelerator can be an application specific IC (ASIC), a programmable IC, or any other accelerator IC.

While the foregoing is directed to specific examples, other and further examples may be devised without departing from the basic scope thereof, and the scope thereof is determined by the claims that follow.

What is claimed is:

1. A method comprising:
   identifying different specifications for an integrated circuit (IC) design, each specification of the different specifications including a same group of criteria categories, each specification of the different specifications having a different criterion for at least one criteria category of the group of criteria categories relative to each other specification of the different specifications, each specification of the different specifications corresponding to a use application different from a respective use application of each other specification of the different specifications;
   designing the IC design to meet the different specifications based on expected manufacturing variation;
   causing the IC design to be manufactured as IC products;
   causing at least some of the IC products to be tested; and
   characterizing the IC products as meeting respective ones of the different specifications based on testing the at least some of the IC products.

2. The method of claim 1, wherein designing the IC design includes:
   obtaining historical data of one or more manufacturing processes that are to be used to manufacture the IC design; and
   performing a statistical analysis of the historical data to obtain the expected manufacturing variation.

3. The method of claim 1, wherein designing the IC design includes determining an expected distribution of IC products meeting the different specifications comprising simulating the IC design based on the expected manufacturing variation.

4. The method of claim 1, wherein the group of criteria categories lifetime, power consumption, leakage current, junction temperature, ambient environment temperature, operating speed, or a combination thereof.

5. The method of claim 1, wherein a respective one or more use application of the use applications is a data center application, a machine learning application, a cryptocurrency application, or an automotive application.

6. The method of claim 1, wherein the IC design is for an IC product comprising a field programmable gate array (FPGA).

7. The method of claim 6, wherein designing the IC design comprises creating a speed file of the IC design for each of the different specifications.

8. The method of claim 1, wherein the IC design is for an IC product comprising a die stack, the die stack comprising an active die-on-active die (AoA).

9. A method comprising:
   providing historical data related to one or more manufacturing processes;
   manufacturing integrated circuit (IC) products based on an IC design using the one or more manufacturing processes, wherein the IC design is designed based on an expected manufacturing variation to meet different specifications, each specification of the different specifications including a same group of criteria categories, each specification of the different specifications having a different criterion for at least one criteria category of the group of criteria categories relative to each other specification of the different specifications, each specification of the different specifications corresponding to a use application different from a respective use application of each other specification of the different specifications, the expected manufacturing variation being derived from a statistical analysis of the historical data; and testing at least some of the IC products to obtain test results, wherein the IC products are capable of being characterized for respective ones of the different specifications based on the test results.

10. The method of claim 9, wherein the IC design is designed to meet the different specifications including determining an expected distribution of IC products meeting the different specifications comprising simulating the IC design based on the expected manufacturing variation.

11. The method of claim 9, wherein a respective one or more use application of the use applications is a data center application, a machine learning application, a cryptocurrency application, or an automotive application.

12. The method of claim 9, wherein the IC design is for an IC product comprising a field programmable gate array (FPGA).

13. The method of claim 9, wherein the IC design is for an IC product comprising a die stack, the die stack comprising an active die-on-active die (AoA).

14. A method comprising:
performing a statistical analysis of data obtained for one or more manufacturing processes to generate expected manufacturing variation;
creating an integrated circuit (IC) design to meet different specifications based on the expected manufacturing variation, each specification of the different specifications including a same group of criteria categories, each specification of the different specifications having a different criterion for at least one criteria category of the group of criteria categories relative to each other specification of the different specifications, each specification of the different specifications corresponding to a use application different from a respective use application of each other specification of the different specifications, creating the IC design including determining whether the IC design is expected to meet the different specifications comprising simulating the IC design using the expected manufacturing variation;
manufacturing IC products based on the IC design and using the one or more manufacturing processes;
performing testing to determine characteristics of the IC products; and
characterizing the IC products to meet respective ones of the different specifications based on the characteristics.

15. The method of claim 14, wherein the IC design is for an IC product comprising a field programmable gate array (FPGA).

16. The method of claim 15, wherein creating the IC design comprises creating a speed file of the IC design for each of the different specifications.

17. The method of claim 14, wherein the IC design is for an IC product comprising a die stack, the die stack comprising an active die-on-active die (AoA).

* * * * *

UNITED STATES PATENT AND TRADEMARK OFFICE
CERTIFICATE OF CORRECTION

PATENT NO. : 10,908,598 B1
APPLICATION NO. : 16/426945
DATED : February 2, 2021
INVENTOR(S) : Praful Jain Page 1 of 1

It is certified that error appears in the above-identified patent and that said Letters Patent is hereby corrected as shown below:

In the Claims

Column 10, Line 33, Claim 4, after "categories" insert -- includes --.

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*